(12) United States Patent
Fujinaka

(10) Patent No.: US 8,141,691 B2
(45) Date of Patent: Mar. 27, 2012

(54) MECHANISM FOR ADJUSTMENT OF VEHICLE OPERATING LEVER

(75) Inventor: Takashi Fujinaka, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 793 days.

(21) Appl. No.: 12/285,302

(22) Filed: Oct. 1, 2008

(65) Prior Publication Data
US 2009/0084654 A1    Apr. 2, 2009

(30) Foreign Application Priority Data
Oct. 2, 2007   (JP) .................. 2007-259013

(51) Int. Cl.
*F16D 13/75* (2006.01)
*F16D 65/46* (2006.01)
*B62M 25/04* (2006.01)

(52) U.S. Cl. ............... 192/99 S; 74/501.5 R; 74/502.2; 188/196 M; 192/111.11

(58) Field of Classification Search ........... 192/111.11
See application file for complete search history.

(56) References Cited

U.S. PATENT DOCUMENTS

| | | | | |
|---|---|---|---|---|
| 4,023,653 A | * | 5/1977 | Yoshigai | 188/196 M |
| 5,674,142 A | * | 10/1997 | Jordan | 74/502.4 |
| 6,374,696 B1 | * | 4/2002 | Blake et al. | 74/527 |
| 7,083,035 B2 | * | 8/2006 | Noguchi et al. | 192/99 S |

FOREIGN PATENT DOCUMENTS

| | | | |
|---|---|---|---|
| JP | 2001-14047 A | * | 1/2001 |
| JP | 2004-359182 | | 12/2004 |

* cited by examiner

*Primary Examiner* — Rodney Bonck
(74) *Attorney, Agent, or Firm* — Rabin & Berdo, P.C.

(57) ABSTRACT

An operating lever, for example for use in a vehicle, is provided. The operating lever may comprise a lever holder, and an operating component pivotably coupled to the lever holder. Manipulation of the operating component may regulate or control a "pulling margin" of a wire that operates a device such as a clutch. The operating component and the lever holder may contact each other circumferentially at a contact portion. At the contact portion, projections on respective surfaces of the operating component and lever holder may engage each other in such a way that when the operating component is turned to regulate the pulling margin, the operating component undergoes elastic deformation in a radial direction. In this way, a definite operating feel is transmitted to a person operating the operating component.

20 Claims, 8 Drawing Sheets

US 8,141,691 B2

MECHANISM FOR ADJUSTMENT OF VEHICLE OPERATING LEVER

CROSS-REFERENCE TO RELATED APPLICATION

This Application is based on, and claims priority of, Japanese Patent Application No. 2007-259013 filed on Oct. 2, 2007, the contents of which are incorporated herein by reference.

TECHNICAL FIELD

The present invention relates to a mechanism for adjustment of an operating lever of a vehicle, for example a "straddle-type" vehicle such as a motorcycle.

BACKGROUND ART

An operating lever including a mechanism for adjustment of a "pulling margin" of a clutch wire is disclosed in, for example, JP-A-2004-359182. The latter describes a structure in which a dial component is operated to regulate or control a degree or amount of slack in a clutch wire, also referred to as a "pulling margin" of the wire. The structure includes a lever holder or bracket covered by a lever cover. Projections on an end surface of the cover and on an end surface of an opposing dial component engage each other so as to provide a definite operating feel when the dial component is turned or rotated.

SUMMARY OF THE INVENTION

An operating lever according to embodiments of the invention may comprise a lever holder, and a lever pivotably mounted or otherwise pivotably coupled to the lever holder. One end of a wire may be coupled or fastened, e.g., clamped, to the lever, and the other end of the wire may be coupled to an operated component, and to an operating component mounted or otherwise coupled to the lever holder. Manipulation of the operating component, for example turning or rotating of the operating component, may regulate or control a pulling margin of the wire. The operating component and the lever holder may contact each other circumferentially at a contact portion. At the contact portion, projections on respective surfaces of the operating component and lever holder may engage each other in such a way that when the operating component is turned to regulate the pulling margin, the operating component undergoes elastic deformation in a radial direction. In this way, a definite operating feel is transmitted to a person operating the operating component.

DETAILED DESCRIPTION OF THE INVENTION

Embodiments of the invention will now be described in more detail by way of example with reference to the embodiments shown in the accompanying figures. It should be kept in mind that the following described embodiments are only presented by way of example and should not be construed as limiting the inventive concept to any particular physical configuration.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially", "essentially" and "nearly", means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

Figure 1:
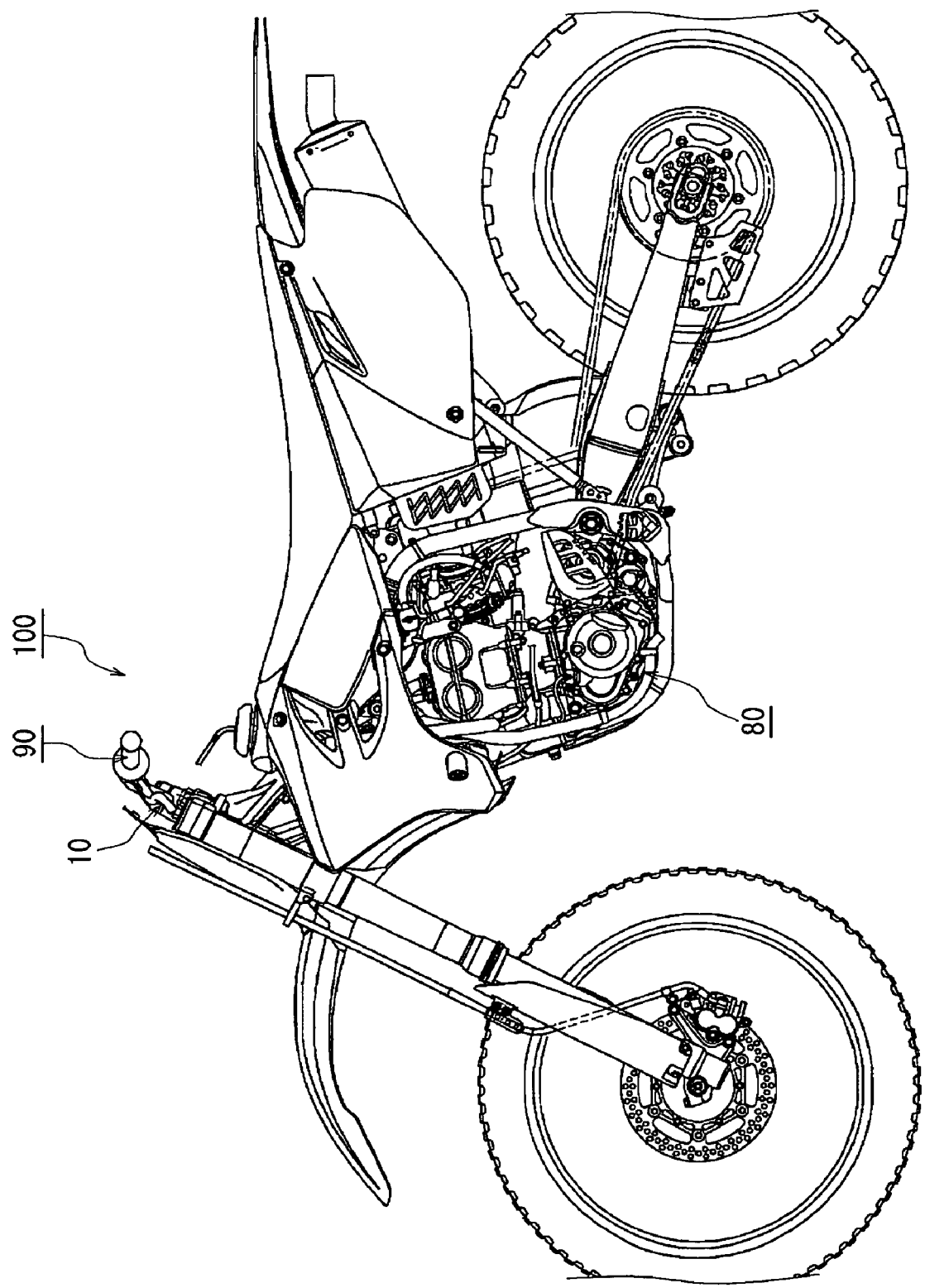
FIG. 1 shows a "straddle-type" vehicle, e.g., a motorcycle, according to an embodiment of the invention.

Referring to FIG. 1, in embodiments of the invention, an operating lever 10 may function as a clutch lever of a vehicle 100, for example a "straddle-type" vehicle (i.e., a vehicle that a rider straddles) such as a motorcycle. The vehicle 100 could be, for example, an off-road racing motorcycle. The operating lever 10 may be mounted or otherwise coupled to a handle 90 of the vehicle 100, as shown in FIG. 1.

Figure 2:
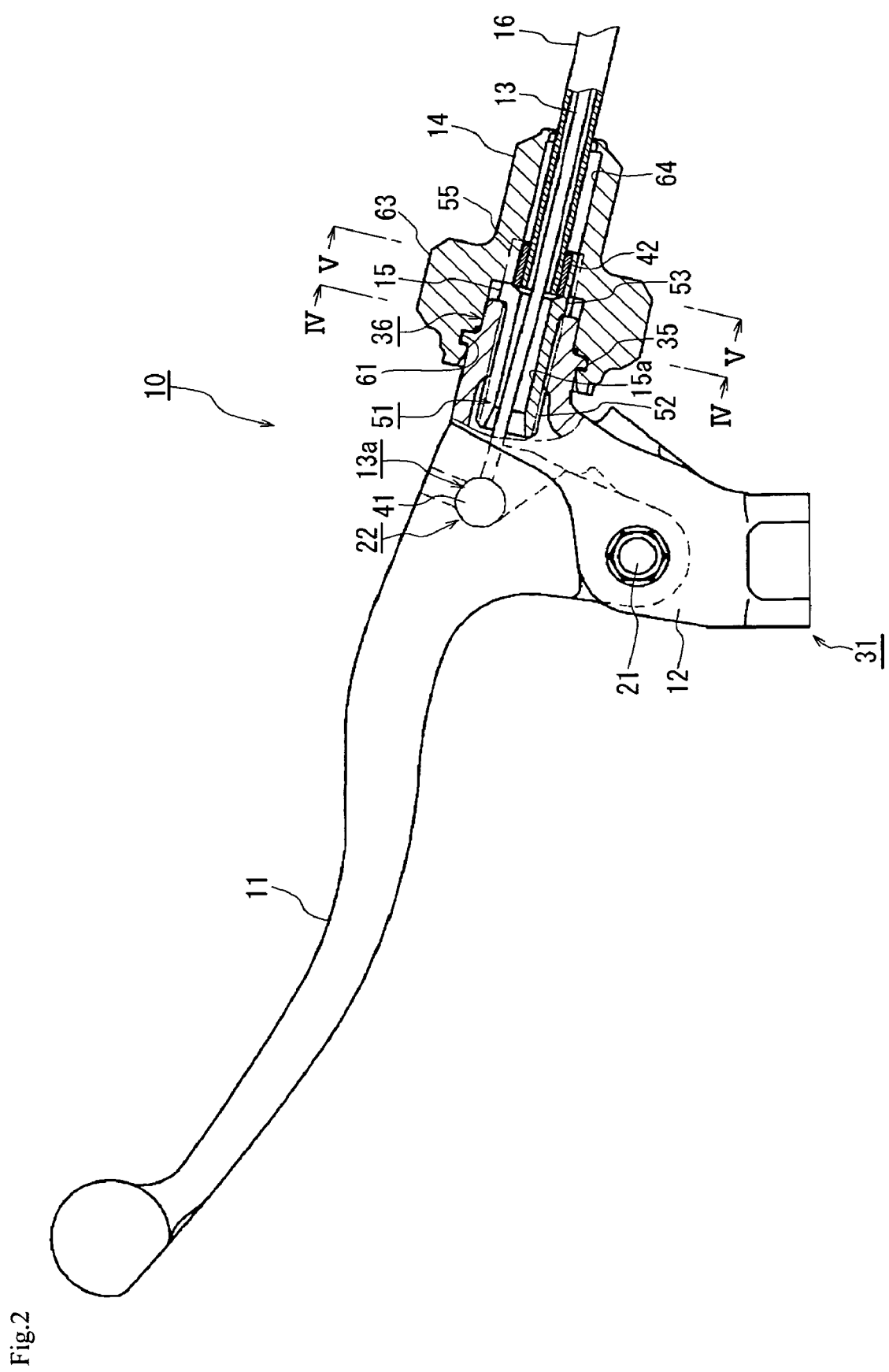
FIG. 2 is a partial, cross sectional view showing an operating lever according to an embodiment of the invention.
Figure 3:
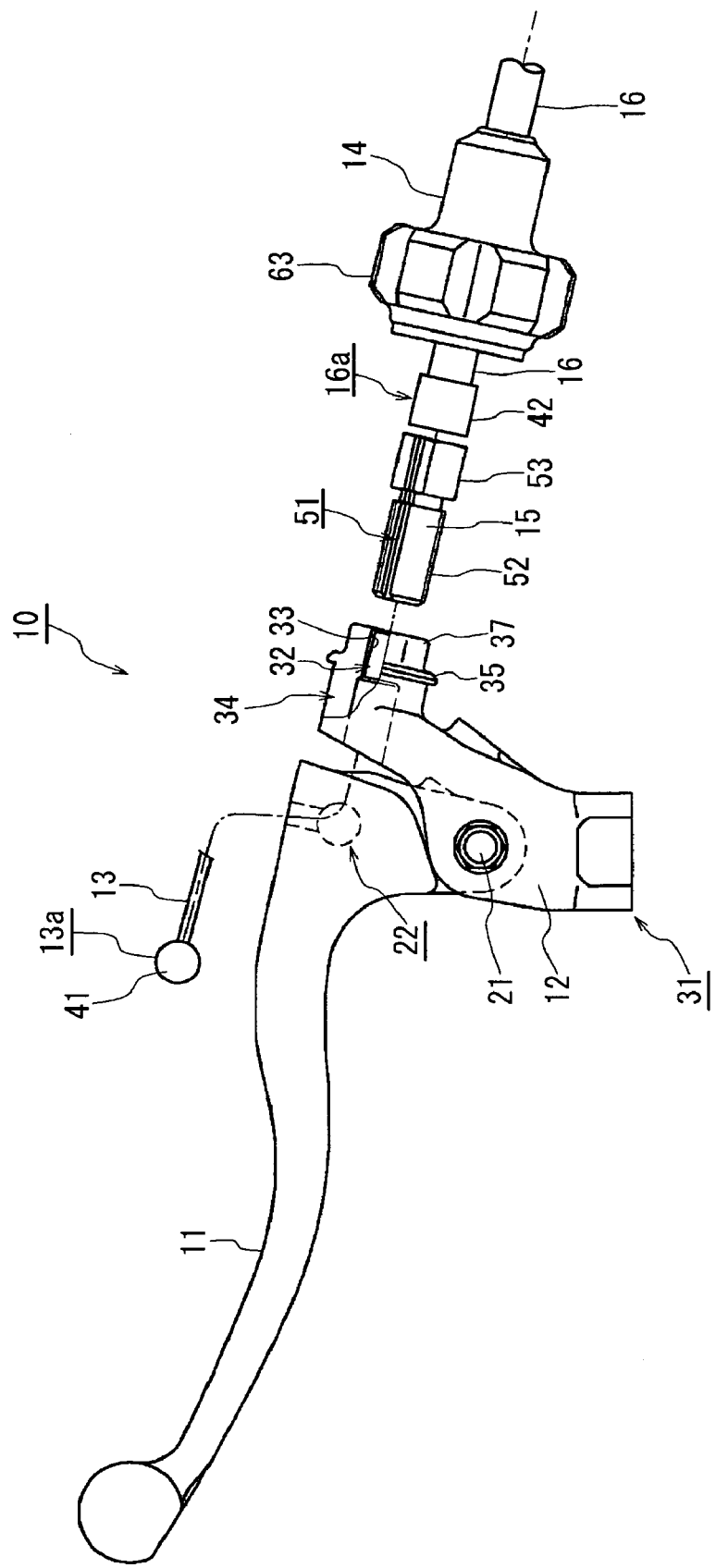
FIG. 3 is an exploded view of the operating lever shown in FIG. 2.

As shown in FIGS. 2 and 3, the operating lever 10 may include a lever 11, a lever holder 12, a wire 13, and an operating component 14. The operating component 14 may be rotatably mounted or otherwise rotatably coupled to the lever holder 12. Turning, rotating, twisting or otherwise manipulating the operating member may regulate or control a pulling margin of the wire 13. An adjusting screw 15 may enable adjustment of the pulling margin.

The lever 11 may be pivotably mounted or otherwise pivotably coupled to a pivot shaft 21 fixed to, passing through or otherwise engaging the lever holder 12. A clamping portion 22 may clamp or otherwise hold or engage an end of the wire 13.

The lever holder 12 may pivotably mount or otherwise pivotably hold or couple the lever 11 to the handle 90 of the vehicle 100. The lever holder 12 may, for example, be made of metal. For example, the lever holder 12 may be formed by aluminum casting. The lever holder 12 may be mounted to the handle 90 by way of a mount portion 31 located at a base end of the lever holder 12, as shown in FIG. 2.

The pivot shaft 21 of the lever 11 may be mounted to or otherwise arranged at an intermediate portion of the lever holder 12. As shown in FIG. 3, an insertion hole 32 may be formed at a tip end of the lever holder 12. The wire 13 may be inserted through the insertion hole 32 and thereby directed to the clamping portion 22, to clamp or otherwise hold or fasten the wire 13 to the lever 11. Female threads 33 may be formed on an inner peripheral surface of the insertion hole 32, and the adjusting screw 15 may be threaded into the female threads 33. An end 13a of the wire 13 may be clamped or otherwise held or engaged by the clamping portion 22, opposite the insertion hole 32.

A slit 34 may be formed on the insertion hole 32, and the wire 13 may be inserted into the insertion hole 32 through the slit 34. As described previously, a pulling margin of the wire 13 may be regulated or controlled by manipulation of the operating component 14. Moreover, by regulating the pulling margin, play of the lever 11 may be correspondingly regulated. Regulating the play of the lever 11 may enable use of the lever 11 to perform clutch operations, for example, including disconnection of a clutch and "semi-clutch" operations. In particular, the pulling margin of the wire 13 and associated play in the lever 11 may regulate the timing of clutch disconnection and "semi-clutch" operations.

Referring now to FIGS. 2 and 3, the operating component 14 may be arranged opposite the lever 11. A flange 35 may be formed on or mounted or coupled to the lever holder 12, and be received in a recess of or otherwise engage the operating component 14. The lever holder 12 may include a contact portion 36 which is received within and engages the operating component 14 in circumferential contact. A projection 37a (see also FIG. 4) may be formed on an outer peripheral surface of the contact portion.

Figure 6:
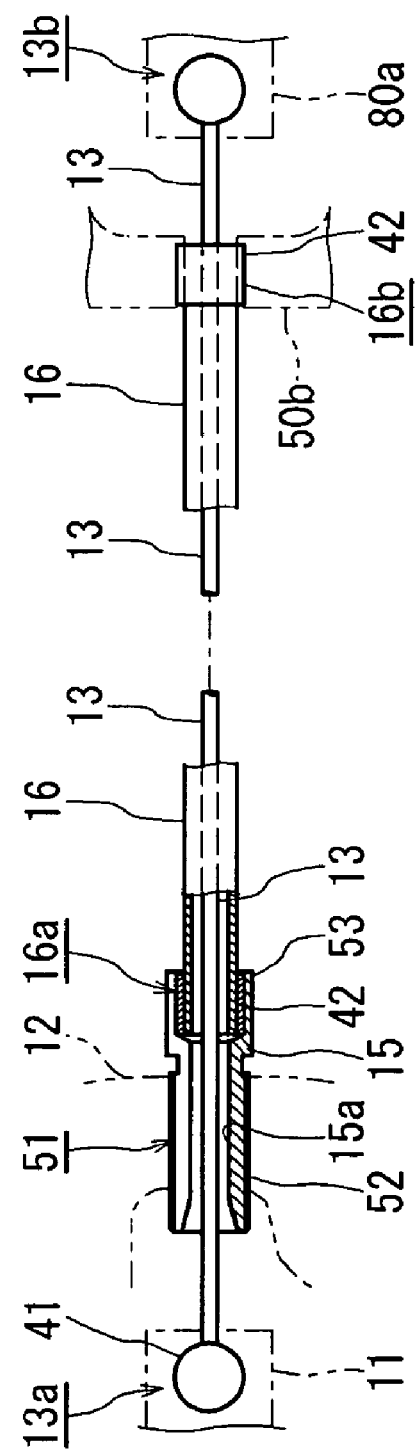
FIG. 6 shows a wire arrangement structure in the operating lever.
Figure 7:
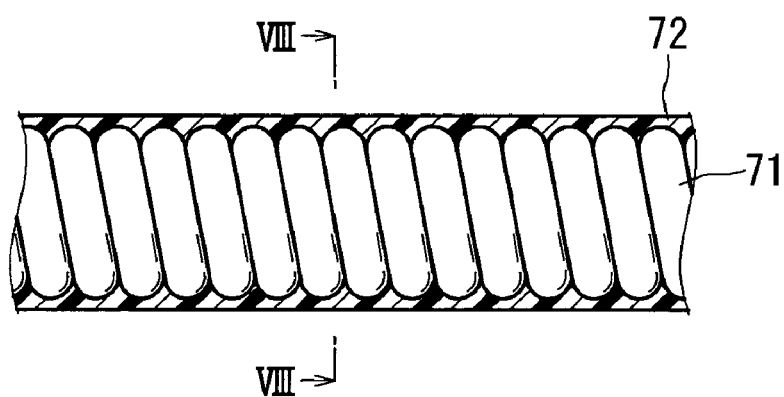
FIG. 7 is a longitudinal, side cross sectional view showing the structure of a wire for the operating lever.
Figure 8:
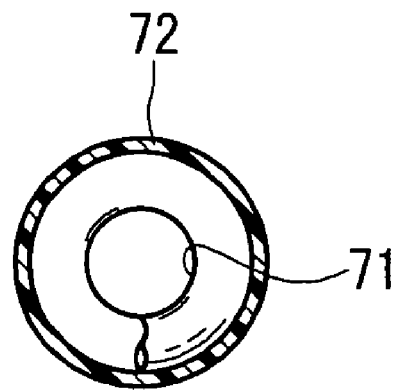
FIG. 8 is a transverse, cross sectional view showing a cross section taken along the line VIII-VIII of FIG. 7.

As shown in FIG. 6, one end 13a of the wire 13 may be clamped to or otherwise fastened to or held by the lever 11, and the other end 13b of the wire 13 may be coupled to an operated component such as a clutch 80a of an engine 80 (see FIG. 1). An anchor material 41 may be formed or mounted on an end 13a of the wire 13, to anchor or fasten or hold the wire 13 to the clamping portion 22 of the lever 11. The wire 13 may pass through a tube or outer wire 16. The tube 16 may be made of an elastic material and have fittings 42 at both ends. As shown in FIGS. 7 and 8, the wire 13 (inner wire) may comprise a spirally wound wire 71 made of, for example, iron, coated with a resin 72. A wire assembly as shown in FIGS. 7 and 8 and described in the foregoing has the advantage of being difficult to deform in an axial direction, yet easy to bend in other directions.

Figure 5:
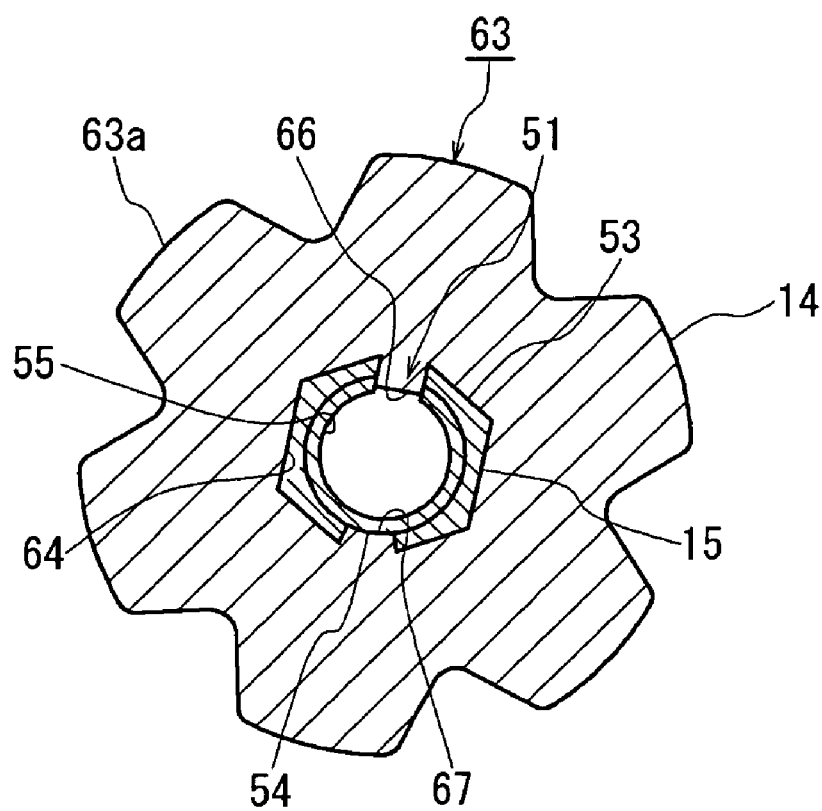
FIG. 5 is a cross sectional view showing an adjusting screw and an operating member in a cross section taken along the line V-V of FIG. 2.

Referring now to FIGS. 2, 3 and 5, the adjusting screw 15 may be a component, having a hollow portion 15a axially formed therethrough, with a through slit 51. The wire 13 may pass through the slit 51. The adjusting screw 15 may further include a male thread portion 52 and a head 53. As shown in FIG. 5, the head 53 of the adjusting screw 15 may be hexagonal in shape, and a groove 54 may be axially formed on an opposite side to the slit 51. The head 53 may include a seat portion 55, into which the fitting 42 of an end 16a of the tube 16 is fitted (see FIG. 6). The adjusting screw 15 may be received within the insertion hole 32 of the lever holder 12, opposite the lever 11. The male thread portion 52 of the adjusting screw 15 may be threaded into the female threads 33 of the insertion hole 32.

As shown in FIG. 6, the end 13a of the wire 13 may be clamped or otherwise fastened to the lever 11, and the other end 13b of the wire 13 may be coupled to the clutch 80a. The end 16a of the tube 16 may be fitted into the head 53 of the adjusting screw 15 and the other end 16b of the tube 16 may be fixed or otherwise coupled to an armor component 50b of the clutch 80a. In a relaxed or at-rest state or position, some slack may be present in the wire 13. When the lever 11 is pulled, for example by squeezing it toward the handle 90, the slack in the wire 13 may be taken up, thereby using up or consuming pulling margin. When all the slack is taken up, thereby consuming all of the pulling margin, the clutch 80a may be operated due to a force exerted by the wire 13.

Figure 4:
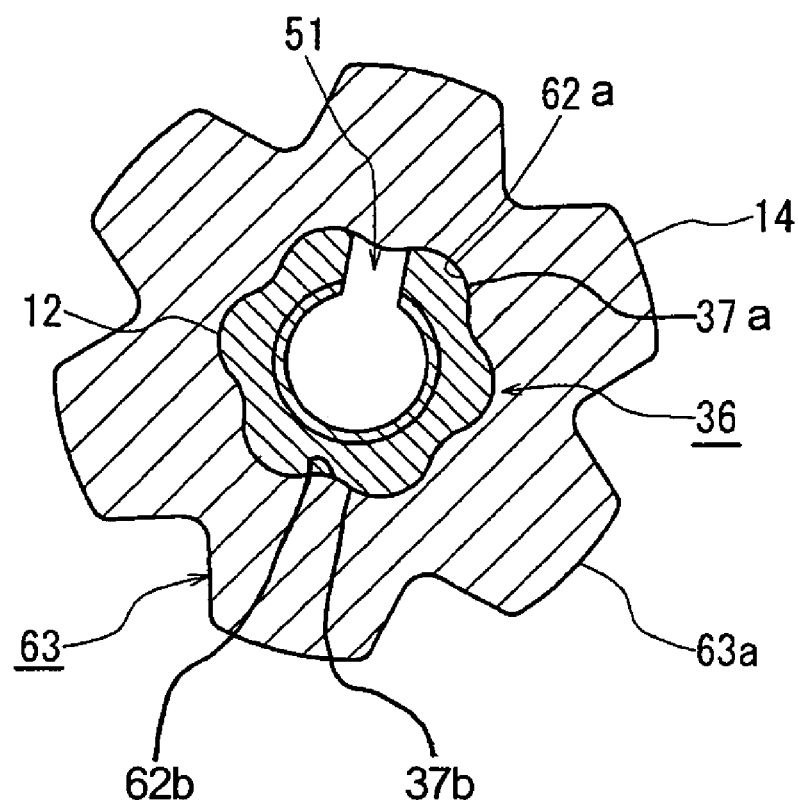
FIG. 4 is a cross sectional view showing a lever holder and an operating member in a cross section taken along the line IV-IV of FIG. 2.

As described previously, the operating component 14 may be rotatably mounted to or otherwise rotatably coupled to the lever holder 12. The operating component 14 may comprise a substantially cylindrical part made of an elastic material such as rubber or plastic. As shown in FIG. 2, the operating component 14 may be arranged opposite the lever 11. A groove 61 may be formed in the operating component 14 to receive the flange 35 formed on the lever holder 12. The operating component 14 may circumferentially contact an outer periphery of the lever holder 12 at the contact portion 36. As shown in FIG. 4, a recess 62a formed on an inner peripheral surface of the operating component 14 and a projection 37a formed on the lever holder 12 may engage each other. Similarly, a projection 62b formed on the inner peripheral surface of the operating component 14 and a recess 37b formed on the lever holder 12 may engage each other. A plurality of the projections 62b, 37a may engage or mesh with a plurality of corresponding recesses 62a, 37b. The projections 62b and 37a can slip over and past each other when the operating component 14 is turned or rotated relative to the lever holder 12, with the projections 62b undergoing elastic deformation as they move past projections 37a. More specifically, when the operating component 14 is rotated relative the lever holder 12, a projection 62b may first be compressed as it moves past a neighboring projection 37a, and then expand outward in a radial direction as it clears the projection 37a. An operating portion 63 (e.g., a dial) operated to turn the operating component 14 may be formed on an intermediate portion of an outer peripheral surface of the operating member 14. A plurality of projections 63a for manipulation by a person's hands and fingers, for example, may be circumferentially distributed on an outer peripheral surface of the operating portion 63. The operating portion 63 may be arranged so as to be substantially aligned, in a radial direction, with the contact portion 36.

Referring now to FIGS. 2, 3 and 5, an axial operating hole 64 may be formed in the operating component 14, and the head 53 of the adjusting screw 15 may be fitted into the operating hole 64. The operating component 14 and adjusting screw 15 may be configured so that when the operating component 14 is turned, the adjusting screw 15 is also turned. When the adjusting screw 15 is turned, a length over which the male thread portion 52 is threaded into the female threads 33 of the lever holder 12 is changed, and the head 53 of the adjusting screw 15 is axially moved in the operation hole 64 a distance corresponding to the change. As shown in FIG. 5, the operating component 14 may include projections 66, 67, fitted, respectively, into the slit 51 and the groove 54 of the adjusting screw 15.

Referring now to FIGS. 2, 3 and 6, as described previously, the operating lever 10 may be configured so that when the operating component 14 is turned, the adjusting screw 15 is turned, and moves relative to the insertion hole 32 of the lever holder 12. As a result, a distance between the end 16a of the tube 16 fitted into the head 53 of the adjusting screw 15, and the end 13a of the wire 13, is changed.

When the operating component 14 is turned in or rotated or otherwise manipulated so as to move in the direction of the insertion hole 32, the end 16a of the tube 16 approaches the end 13a of the wire 13 fastened to the lever 11. Correspondingly, slack of the wire 13 in the tube 16 is increased and the pulling margin of the wire 13 (play of the lever 11) is increased. When the pulling margin of the wire 13 (play of the lever 11) is increased, the timing of lever 11 operations, such as clutch operations, is delayed, because greater slack must be taken up before the wire 13 is pulled by the tube 16 when the lever 11 is pulled. In contrast, when the operating component 14 is manipulated so as to move away from the insertion hole 32, the end 16a of the tube 16 is moved further from the end 13a of the wire 13 fastened to the lever 11. Correspondingly, slack of the wire 13 in the tube 16 is decreased and the pulling margin of the wire 13 (play of the lever 11) is decreased. When the pulling margin of the wire 13 (play of the lever 11) is decreased, the timing of lever 11 operations is quickened or sped up, because less slack must be taken up before the wire 13 is pulled by the tube 16 when the lever 11 is pulled.

As described previously, when the operating component 14 is rotated relative the lever holder 12, projections 62b may be compressed due to elastic deformation as they move past respective neighboring meshed projections 37a, and then expand outward in a radial direction as they move clear of respective neighboring projections 37a. This transmits a definite operating feel to an operator, such as a rider of a vehicle 100.

The definite operating feel is advantageous, for example, because riders of motorcycles often wear gloves, and the operating feel can be transmitted even through the gloves, whereas otherwise the operating feel might be muted or absent. Moreover, the operating lever 10 according to the above-described embodiments is simpler in structure than comparable known structures, for example because there is no need to provide a lever cover for a mechanism for adjustment of a pulling margin of the wire 13. Therefore, manufacture is easier and has a lower cost.

Another advantage is that the definite operating feel transmitted by the projections 37a, 62b makes it easy for a rider to set a suitable pulling margin of the wire 13 for himself/herself.

The above-described operating feel is further enhanced by the projections 63a of the dial 63 of the operating component 14.

The operating feel may be still further enhanced in embodiments wherein the lever holder 12 is metallic (e.g., made by aluminum casting), while the operating component 14 is made of a softer material, such as rubber or resin. In such a case, the elastic compression and expansion of the projections 62 when the operation component 14 is turned may yield a still more definite operating feel. A still further advantage of the above-described embodiments is that a definite operating feel can be transmitted to a rider even, for example, when the vehicle 100 is a motorcycle being ridden in an off-road race, and the operating lever 11 is being used as a clutch. Additionally, because the operating feel is easily adjusted, the vehicle 100 can be readily shared among a number of people. It will be understood that the above description of the preferred embodiments of the present invention are susceptible to various modifications, changes and adaptations, and the same are intended to be comprehended within the meaning and range of equivalents of the appended claims. For example, while a configuration applied to a clutch lever has been described and illustrated, the operating lever according to embodiments of the invention is applicable to various levers besides a clutch lever, for example, a brake lever. In addition, "straddle-type vehicle" as referred to herein includes various motorcycles, for example, scooter type motorcycles and bicycles with a motor (motor bike). Also, "straddle-type vehicle" includes, for example, vehicles with more than two wheels, such as ATVs (All Terrain Vehicles), and vehicles without wheels, such as snowmobiles.

What is claimed is:

1. An operating lever, comprising:
   a lever holder;
   a lever pivotably coupled to the lever holder;
   a wire having one end thereof coupled to the lever and another end coupled to an operated component; and
   an operating component rotatably coupled to the lever holder, the operating component regulating a pulling margin of the wire; wherein
   the operating component circumferentially contacts an outer periphery of the lever holder, with projections on the operating component engaging projections on the lever holder where the operating component contacts the lever holder;
   the projections on the operating component are configured to undergo elastic deformation when the operating component is rotated relative to the lever holder,
   all the projections on the operating component and the lever holder project in radial directions, and
   the projections range substantially continuously over substantially an entire inner circumferential surface of the operating component and substantially an entire outer circumferential surface of the lever holder so as to make contact at a contact portion of the lever holder.

2. The operating lever as recited in claim 1, wherein the operating component comprises an operating portion to rotate the operating component.

3. The operating lever as recited in claim 1, wherein the operating component is formed of a softer material than a material of the lever holder.

4. The operating lever as recited in claim 1, wherein
   the operating component is formed of rubber or a resin and the lever holder is formed of metal.

5. A vehicle comprising the operating lever as recited in claim 1.

6. The vehicle as recited in claim 5,
   wherein the operated component comprises a clutch, and
   wherein the operating lever comprises a clutch lever for operation of the clutch.

7. The vehicle as recited in claim 5, wherein a lever holder of the operating lever is mounted to a handle of the vehicle.

8. The vehicle as recited in claim 5, wherein the vehicle is a straddle-type vehicle.

9. A lever device for a vehicle, comprising:
   an operating component to rotatably control a pulling margin of a wire, wherein
   the operating component is in circumferential contact with a lever component, projections formed on an inner periphery of the operating component engage projections on an outer periphery of the lever component where the operating component contacts the lever component, and
   the projections formed on the operating component are configured to be elastically deformable when the operating component is rotated with respect to the lever component,
   all the projections on the operating component and the lever component project in radial directions, and
   the projections range substantially continuously over substantially an entire inner circumferential surface of the operating component and substantially an entire outer circumferential surface of the lever component so as to make contact at a contact portion of the lever component.

10. The lever device as recited in claim 9, wherein the operating component further comprises an adjustment component to rotatably adjust the pulling margin.

11. The lever device as recited in claim 10, wherein the adjustment component comprises a rotatable element disposed in an axial cavity formed in the operating component.

12. The lever device as recited in claim 11, wherein the rotatable element is coupled to a slack-control element for controlling a slack in the wire.

13. The lever device as recited in claim 12, wherein by manipulation of the operating component, the rotatable element changes a relationship between the slack-control element and the wire.

14. The lever device as recited in claim 13, wherein the rotatable element comprises a screw.

15. The lever device as recited in claim 13, wherein the slack-control element comprises a tube around the wire.

16. A lever device, comprising:
    lever means for operating a wire-operated device; and
    regulating means for regulating a pulling margin of a wire coupled to the wire-operated device; wherein
    the regulating means circumferentially contacts an outer periphery of the lever means, projections on the regulating means engaging projections on the lever means where the regulating means contacts the lever means; and
    the projections on the regulating means are configured to undergo elastic deformation when the regulating means is rotated relative to the lever means,
    all the projections on the regulating means and the lever means project in radial directions, and
    the projections range substantially continuously over substantially an entire inner circumferential surface of the regulating means and substantially an entire outer circumferential surface of the lever means so as to make contact at a contact portion of the lever means.

17. The lever device of claim 16, wherein the wire-operated device is a clutch.

18. The lever device of claim 16, wherein the wire-operated device is a brake.

19. The lever device of claim 16, further comprising slack-control means for controlling a slack in the wire.

20. The lever device of claim 16, wherein the slack-control means includes a rotatable element axially disposed within the regulating means.

* * * * *